United States Patent [19]  [11] 3,948,548
Voss  [45] Apr. 6, 1976

[54] HOSE AND PIPE COUPLING
[75] Inventor: Hans-Hermann Voss, Iserlohn, Germany
[73] Assignee: Armaturenfabrik Hermann Voss, Wipperfurth, Germany
[22] Filed: Nov. 6, 1974
[21] Appl. No.: 521,438

[30] Foreign Application Priority Data
Nov. 11, 1973 Germany.......................... 7340346
Sept. 20, 1974 Germany.......................... 2444993

[52] U.S. Cl. .................... 285/321; 285/39; 285/178
[51] Int. Cl.² ......................................... F16L 37/00
[58] Field of Search .............. 285/321, 141, 178, 39

[56] References Cited
UNITED STATES PATENTS
| | | | |
|---|---|---|---|
| 2,299,643 | 10/1942 | Moody.............................. | 285/321 X |
| 2,899,215 | 8/1959 | Ardito.............................. | 285/321 X |
| 3,314,696 | 4/1967 | Ferguson et al. ............ | 285/321 UX |
| 3,544,140 | 12/1970 | Langheck .......................... | 285/321 |

*Primary Examiner*—Andrew V. Kundrat
*Attorney, Agent, or Firm*—Allison C. Collard

[57] ABSTRACT
A coupling particularly suitable for connecting hoses and pipes having a coupling head with an internal annular groove adjacent to its input opening and a locking means disposed within that annular groove for locking to a nozzle. The locking means comprises an elastic annular spring member which has a pair of counter directed annular spring arms that define a slot in the spring member. The arms encompass the coupling head while the spring member is disposed within the internal annular groove of the coupling head through a slot-like circumferential opening. The nozzle includes a cone formed on its circumference and an annular groove formed adjacent to the cone so that when the nozzle is inserted into the coupling head the cone will spread the elastic annular spring member allowing the spring member to be finally disposed around the annular slot within the nozzle. Several variations of the annular spring member are also shown.

14 Claims, 9 Drawing Figures

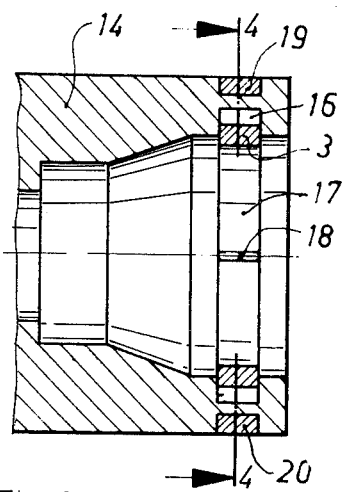
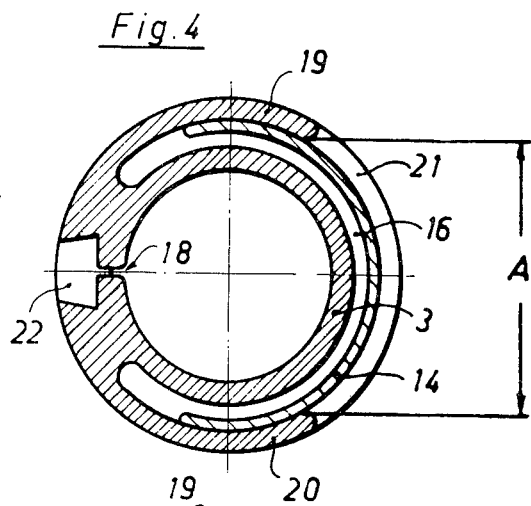
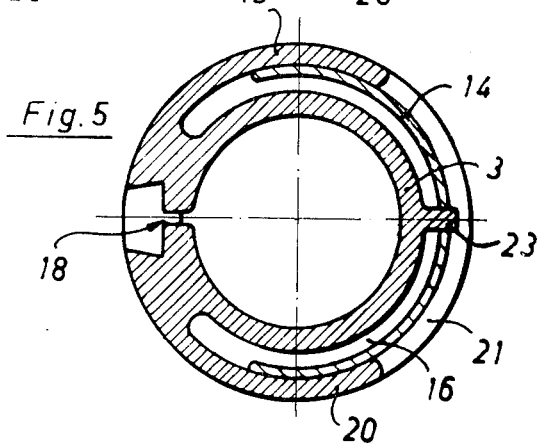
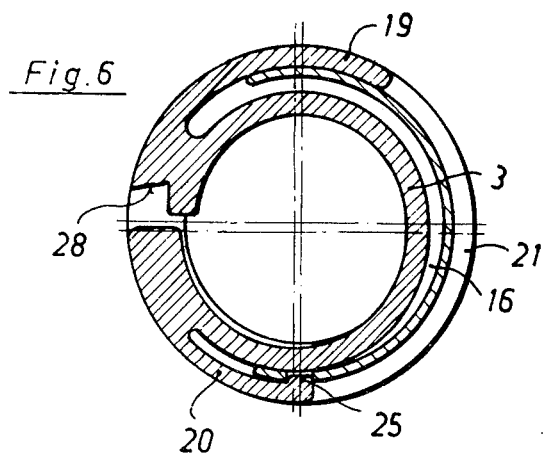

HOSE AND PIPE COUPLING

The present invention relates to a hose and/or pipe coupling essentially consisting of a coupling head, a locking element which may be inserted into the coupling head, and a nozzle which can be locked with the coupling head by means of the locking element.

Conventional hose and/or pipe couplings all have a common disadvantage in that they are too complicated to manufacture and are rather cumbersome to handle.

In the subject invention, a hose and/or pipe coupling is provided consisting of only a few individual members or elements which may be manufactured simply and economically, and can be easily and reliably handled. Furthermore, the subject hose and/or pipe coupling assures a safe locking or arresting of the coupling head with the nozzle. The locking element consists of an elastic annular spring member provided with a slot. Starting from the slot, two counter directed annular arms are provided which encompass the coupling head.

The coupling head is provided with a slot-like circumferential opening for insertion, as well as an inner annular groove for partly receiving the elastic annular spring member. The coupling end of the nozzle is also provided with an annular groove, so as to at least partially receive the elastic spring member when the nozzle is inserted into the coupling head. The inventive coupling can be manufactured simply and economically, and fully meets the technical requirements. The elastic spring member which serves as a locking element, need only be inserted into the circumferential opening of the coupling head for locking the two coupling portions. In its inserted position, the annular elastic spring member is received and guided within the inner groove of the coupling head, while the spring arms engage the coupling head around its outer circumference. In accordance with the invention, it is also advantageous if the chord distance between the spring arm ends corresponds to at least the outer circumference of the elastic annular spring member. This arrangement guarantees that the spring arms will sufficiently encompass the coupling head, thus holding the elastic annular spring member securely in the coupling head.

Another inventive feature is that a cone is provided in front of the annular groove of the nozzle to open the elastic annular spring member. During insertion of the nozzle portion, this cone pushes the elastic annular spring member apart and subsequently it snaps into the annular groove of the nozzle. In order to expand the spring type elastic annular member sufficiently far when the nozzle is inserted, the outer diameter of the elastic annular member should be slightly smaller than the inside diameter of the annular inner groove of the coupling head. After the elastic annular member snaps into the annular groove of the nozzle, the coupling head and the nozzle are securely sealed and locked in their axial position. The elastic spring member is so arranged that it is in a released or relaxed position within the receiving grooves of the coupling head and the nozzle. The inherent spring forces always return the elastic spring member may be easily opened by pushing it apart with an expansion tool means which may be inserted into the slot of the annular elastic spring member. Since the utilization of of such a tool is frequently not feasable and often not available, it is a further feature of the subject invention to provide gripper cams on the outer ends of the spring arms. These gripper cams provide easy manual expansion of the elastic annular spring member which is particularly advantageous in couplings which are not easily accessible. In order to prevent the fingers of the operator from slipping off during the expansion of the elastic annular spring member, it is essential that the upper surface of the gripper cams be provided with a roughened surface.

It is also advantageous, in accordance with the invention to provide an outer annular groove corresponding to the width of the spring arms. This groove is provided on the outer circumference of the coupling head opposite to the inner annular groove. This outer annular groove constitutes an additional guide for the elastic annular spring member. Since the inventive coupling is quite frequently used in hose or pipeline systems which are exposed to a high degree of contamination such as, for example, in motor vehicle brake lines, it is advantageous, in accordance with the subject invention, that the width of the spring arms be wider than the slot-like circumferential opening of the coupling head. Thus, the circumferential opening is substantially covered by the spring arms and penetration of dirt into the inside of the coupling is prevented. In this context, it is also advantageous, in accordance with the invention, if the slot of the elastic annular spring member is shaped like a labyrinth. With this arrangement of the slot, it was found that dirt particles do not have any immediate access through the slot into the inner chamber of the coupling. The dirt particles are prevented from entering the inner space of the coupling due to its labyrinth-like sealing.

In order to prevent the elastic annular spring member from sliding off during dismantling, it is also advantageous in accordance with the invention to provide a trunnion attached on the elastic annular spring member, so that this trunnion extends outwardly into a corresponding bore in the coupling head. The trunnion should be located diametrically with respect to the radial slot opening. With this arrangement, a concentric member is provided for the locking element in the coupling head, so that the total annular surface affects the axial arresting of the individual coupling elements.

In accordance with the invention, a trunnion which is directed radially inwardly may be provided on one spring arm end, whereby a corresponding positioned bore is provided in the annular groove. With such an arrangement, the unlocking of the coupling is facilitated by pushing the side of the slot opening opposite to the trunnion outwardly. In order to obtain a safe unlocking with this embodiment, it is essential to eccentrically mount the annular member in the inner groove of the coupling head. Such an eccentric arrangement may be obtained since the distance of the spring arm together with the associated trunnion is less with respect to the outer circumference of the elastic annular spring member than the distance of the outer free spring arm. The elastic annular spring member is preferably made of plastic material. However, the member may also be made out of any suitable elastic metal material.

Other objects and features of the present invention will become apparent from the following detailed description when taken in connection with the accompanying drawings which disclose several embodiments of the invention. It is to be understood that the drawings are designed for the purposes of illustration only, and are not intended as a definition of the limits and scope of the invention disclosed.

In the drawings, wherein similar reference numerals denote similar elements throughout the several views:

FIG. 3 is a cross sectional view through the nozzle of an inventive coupling head with elastic annular spring member;

FIGS. 4–6 are cross sectional views taken along line IV—IV of FIG. 3 with differently shaped elastic annular spring members;

Figure 1:
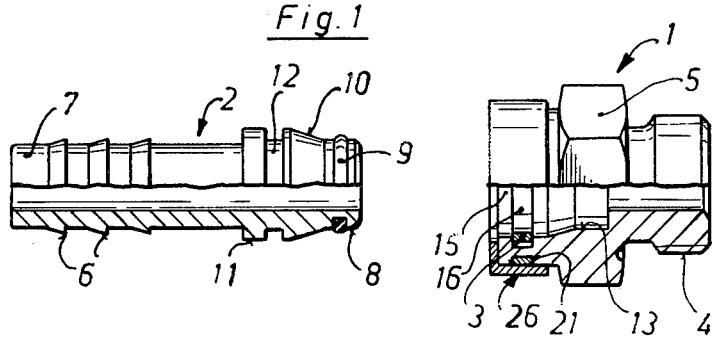
FIG. 1 shows the inventive coupling consisting of a coupling head and nozzle in an unassembled condition.
Figure 2:
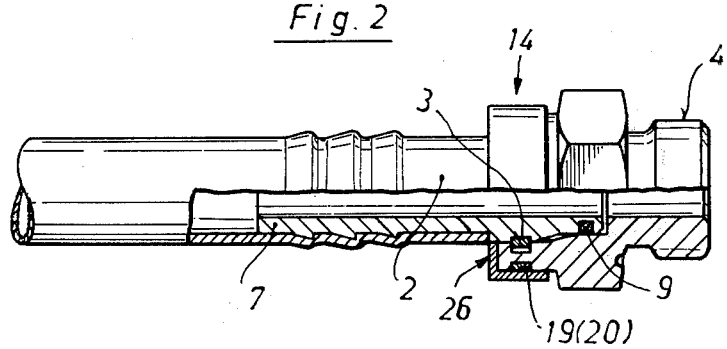
FIG. 2 shows the inventive coupling according to FIG. 1 in an assembled condition.

The inventive coupling according to FIGS. 1 and 2 consists essentially of a coupling head 1 and a nozzle 2, as well as an elastic annular spring member 3 which serves as a locking member and is made, for example, out of plastic material. In accordance with the inventive embodiment, coupling head 1 is provided at its front end with a threaded pipe 4, and at its center with a hexagonal piece 5, which may be engaged by a wrench. Instead of threaded pipe 4, a hose nozzle or the like may be used. Furthermore, it is possible to shape the coupling as a bent T-piece, or the like.

Nozzle 2 is provided with a shaft 7 which has a sawtooth-like section 6. Subsequent thereto, the insertion and locking area is provided. This area essentially consists of a cylindrical portion 8 and a sealing ring 9 which is inserted into a groove. Subsequent to sealing ring 9, a cone 10 is provided for expanding the elastic annular spring member 3. The largest diameter of the cone carries over to a cylindrical shaft portion 11. An annular groove 12 is provided in shaft portion 11 which receives the inner annular face of elastic annular spring member 3.

Coupling head 1 as well as nozzle 2 are provided with a bore section 13 which is sealingly engaged by sealing ring 9. At its nozzle 14, coupling head 1 is provided with a front bore section 15 having an associated inner annular groove 16 for receiving the outer edge portion of annular member 3, the diameter of which is larger than the outer diameter of annular member 3. A slot-like circumferential opening 17 which connects inner groove 16 with the outside of coupling head 1, as shown in FIG. 3, is arranged so that annular member 3 can be inserted from the side into coupling head 1 and groove 16. Therefore, the chord length of circumferential opening 17 corresponds to the outer diameter of annular member 3.

As can be seen from FIGS. 4–6, the elastic annular spring member may have different configurations.

FIG. 4 shows an elastic spring member 3 provided with a radial slot 18 and two spring arms 19 and 20 which start in the range of slot 18 and together form an arc which is larger than 180°. In the subject application and embodiment, it is 240°, and the spring arm ends have a chord distance "A" which is larger than that of the opening 17, and smaller than the outer diameter of the nozzle stay portion 14 (FIG. 4). Therefore, arms 19 and 20 securely arrest annular member 3 on coupling head 1. An outer annular groove 21 is provided on the outer face of coupling head 1, which is positioned opposite to the inner annular groove 16 and which is defined to receive spring arms 19 and 20 of annular member 3. When nozzle 2 is inserted, cone 10 presses against the inner walls of annular member 3 and pushes it apart. As soon as cone 10 is moved through annular member 3, the member snaps back into annular groove 5, due to the inherent spring force. Thus, portions 1 and 2 are arrested in an axial direction with respect to each other. When the coupling is to be dismantled, a pair of straddling pliers, or the like is inserted into recess 22 between spring arms 19 and 20, and annular member 3 is pulled apart until it is removed from groove 12. At this point, nozzle 2 can be removed from coupling head 1.

The elastic spring member according to FIG. 5 has the same basic structure as the one shown in FIG. 4. The difference is that the annular member is associated with a trunnion 23, which engages a corresponding bore in coupling head 1 to prevent twisting.

The examples according to FIGS. 4 and 5 have the common feature that annular member 3 is concentrically arranged in coupling head 1, so that the total annular surface of annular member is effected with respect to the axial load. This is not quite the same with respect to the embodiment shown in FIG. 6, since here an eccentric arrangement of annular member 3 in coupling head 1 is shown. This arrangement has the advantage that the disassembly of the coupling is much simpler, because only a pressure has to be exerted onto wall 28 of slot 18. The eccentric mounting of annular member 3 is obtained by the different distance which arms 19 and 20 have from the circumference of the annular member 3. A secure locking of annular member 3 is provided by cam 25 which is associated on spring arm 20, and engages a corresponding bore in coupling head 1. As shown in FIGS. 1 and 2, nozzle 14 of coupling head 1 may be provided with a protective cap 26 which also covers spring arms 19 and 20, so as to protect the coupling from pollution.

Figure 7:
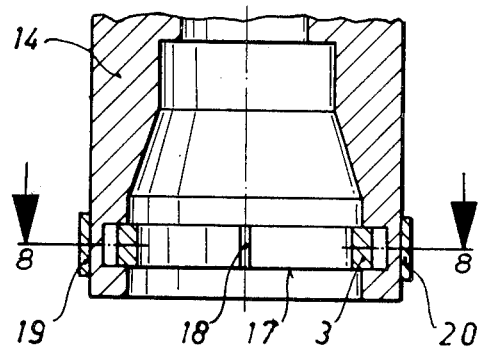
FIG. 7 is a further cross sectional view of the nozzle with elastic annular spring member.
Figure 9:
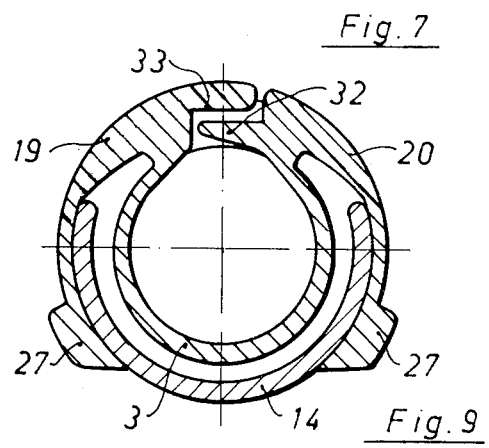
FIGS. 8 and 9 are sectional views taken along lines VIII—VIII of FIG. 7, with differently shaped elastic annular spring members.
Figure 8:
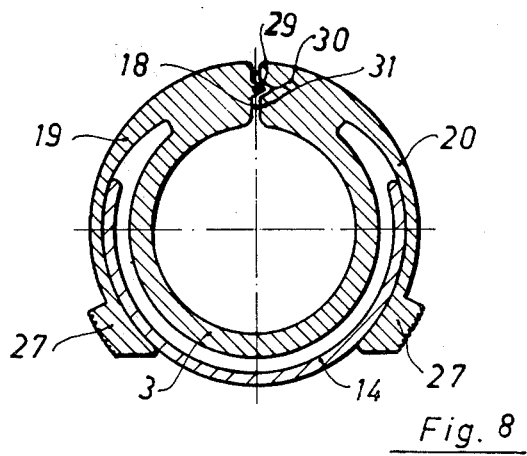

The embodiments of the inventive coupling shown in FIGS. 7 and 9 are characterized in that the spring type elastic annular member 3 has a wider width that the slot-like circumferential opening 17. Furthermore, slot 18 of annular member 3 is arranged like a labyrinth. At the outer ends of spring arms 19 and 20, gripper cams 27 are provided, as shown in FIG. 8, which may have a roughened upper surface. With the assistance of these gripper cams 27, annular member 3 may be spread apart and the coupling may be released. As can be seen from FIGS. 8 and 9, a few possibilities are suggested to shape slot 18 in a labyrinth-like configuration. In FIG. 8 the labyrinth seal has an abutment 29, which in its cross section is triangularly shaped and mounted over the total width of a wall 28, and which extends into a corresponding groove 30 provided in an opposite wall. In FIG. 9, the slotted walls 32 and 33 have, in their cross section, an L-shaped configuration which are arranged so that the longer shanks of the L-shaped walls always extend into the angular range between the longer shank and the shorter shank. In the labyrinth-shaped arrangement of slot 18, it has to be taken into consideration that a certain play exists between the overlapping wall portions of the slot, so that existing tolerances may thereby be balanced.

While only a few embodiments of the present invention have been shown and described, it will be obvious to those skilled in the art that many changes and modifications may be made thereunto without departing from the spirit and scope of the invention.

What is claimed is:

1. A coupling for hoses, pipes and the like comprising:
   a coupling head having an input coupling, a slot-like circumferential opening, and an internal annular groove;
   locking means comprising an elastic annular spring member having a slot and a pair of spring arms extending from said slot in opposite directions in substantially ringlike manner, said pair of spring arms encompassing said coupling head, said locking means being partially inserted in said internal annular groove of said coupling head as well as through said slot-like circumferential opening in the coupling head; and
   a nozzle for insertion into the input coupling opening of said coupling head, said nozzle including an annular groove for at least partly receiving therein said elastic annular spring member.

2. The coupling according to claim 1 wherein the included chord distance between the ends of said spring arms corresponds to at least the outer diameter of elastic annular spring member.

3. The coupling according to claim 1 wherein said nozzle comprises a cone formed in front of the annular groove of said nozzle, said cone expanding the elastic annular spring member when the nozzle is inserted into the coupling head.

4. The coupling according to claim 1 wherein said locking means comprises gripper cams formed on the outer ends of said spring arms; and
   said gripper cams include a roughened surface.

5. The coupling according to claim 1 wherein said coupling head includes an outer annular groove formed on the outer circumference thereof, opposite said inner annular groove said outer annular groove having a width corresponding to the width of said spring arms.

6. The coupling according to claim 5 wherein the end of one spring arm includes a radially inwardly directed cam, and a corresponding bore located in the outer annular groove of said coupling head.

7. The coupling according to claim 1 wherein the width of the spring arms are wider than the slot-like circumferential opening in said coupling head.

8. The coupling according to claim 1 wherein the slot of said elastic annular spring member is in the form of a labyrinth.

9. The coupling according to claim 1 wherein said coupling head comprises a protective cap over its input coupling opening for covering said annular spring member, said cap including a bore on its front face for receiving said nozzle.

10. The coupling according to claim 1 wherein said elastic annular spring member comprises an outwardly projecting trunnion, and said coupling head includes a corresponding bore for receiving said trunnion.

11. The coupling according to claim 10 wherein said trunnion is diametrically located with respect to the slot of said spring member.

12. The coupling according to claim 1 wherein said elastic annular spring member is concentrically mounted in said coupling head.

13. The coupling according to claim 1 wherein said elastic annular spring member is eccentrically mounted in said coupling head.

14. The coupling according to claim 1 wherein said elastic annular spring member consists of a one piece plastic material.

* * * * *

UNITED STATES PATENT OFFICE
CERTIFICATE OF CORRECTION

Patent No. 3,948,548      Dated April 6, 1976

Inventor(s) Hans-Hermann Voss

It is certified that error appears in the above-identified patent and that said Letters Patent are hereby corrected as shown below:

First page, Item [75], after Hans-Hermann Voss, change "Iserlohn"

to --Wipperfurth--.

Signed and Sealed this

Fourteenth Day of September 1976

[SEAL]

*Attest:*

RUTH C. MASON
*Attesting Officer*

C. MARSHALL DANN
*Commissioner of Patents and Trademarks*